United States Patent [19]

Raspet et al.

[11] Patent Number: 4,712,429
[45] Date of Patent: Dec. 15, 1987

[54] WINDSCREEN AND TWO MICROPHONE CONFIGURATION FOR BLAST NOISE DETECTION

[75] Inventors: Richard Raspet, Urbana, Ill.; Mark D. Wagner, Morristown, N.J.

[73] Assignee: The United States of America as represented by the Secretary of the Army, Washington, D.C.

[21] Appl. No.: 755,388

[22] Filed: Dec. 15, 1987

[51] Int. Cl.$^4$ ............................................. G01N 29/00
[52] U.S. Cl. ....................................... 73/646; 367/136; 181/175
[58] Field of Search ................ 73/645, 646, 647, 648; 181/158, 175, 176, 242, 256, 264; 179/178, 179, 184, 187, 188

[56] References Cited

U.S. PATENT DOCUMENTS

| | | | |
|---|---|---|---|
| 1,914,099 | 6/1933 | Bedell | 181/256 |
| 2,200,097 | 5/1940 | Phelps | 181/242 |
| 2,263,408 | 11/1941 | Lakhovsky | 181/242 |
| 2,325,424 | 7/1943 | Rettinger | 179/178 |
| 2,395,719 | 2/1946 | Bright | 181/158 |
| 2,520,706 | 8/1950 | Anderson et al. | 181/242 |
| 2,536,261 | 1/1951 | Caldwell, Jr. | 181/242 |
| 2,623,957 | 12/1952 | Cragg et al. | 181/242 |
| 3,144,519 | 8/1964 | Herbig et al. | 73/646 |
| 3,154,171 | 10/1964 | Knutson et al. | 181/242 |
| 3,265,153 | 8/1966 | Burroughs | 181/158 |
| 3,515,240 | 6/1970 | Sugiyana et al. | 181/158 |
| 3,550,720 | 12/1970 | Ballard | 181/175 |
| 4,195,360 | 3/1980 | Fothergill | 367/136 |
| 4,236,040 | 11/1980 | Chung | 73/646 |
| 4,630,246 | 12/1986 | Fogler | 367/135 |

Primary Examiner—Stewart J. Levy
Assistant Examiner—Louis M. Arana
Attorney, Agent, or Firm—Darrell E. Hollis

[57] ABSTRACT

A system for detecting and monitoring blast noise, the invention provides concentrically arranged cylindrical windscreens having a pair of vertically spaced microphones mounted centrally therein, the windscreens acting to reduce interference from wind-generated pseudosound yet being acoustically transparent so as not to interfere with the reception of acoustical data incident on the microphones. The present system also includes a signal processing subsystem which receives the output of the respective microphones for analysis.

15 Claims, 14 Drawing Figures

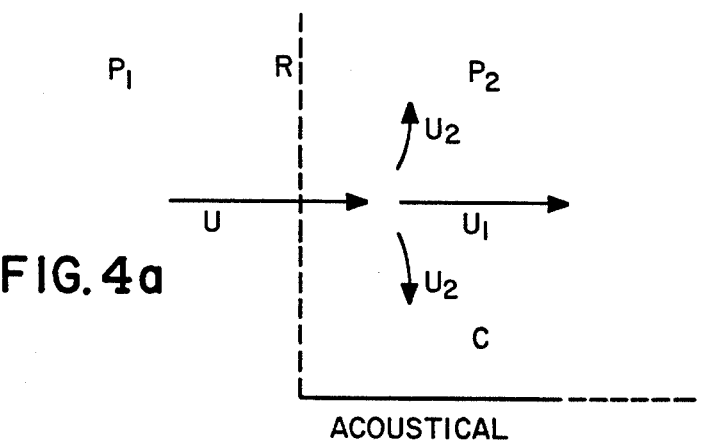
FIG. 4a
ACOUSTICAL
FIG. 4b
ELECTRICAL
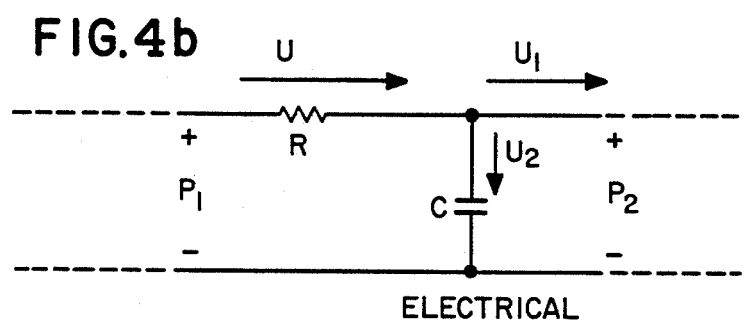
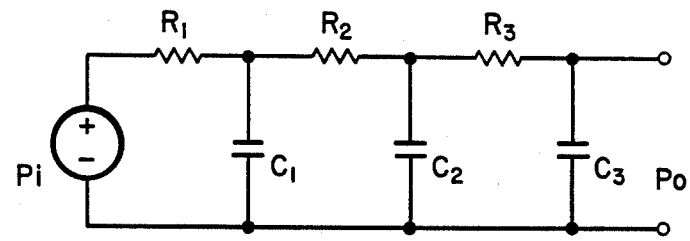
FIG. 5
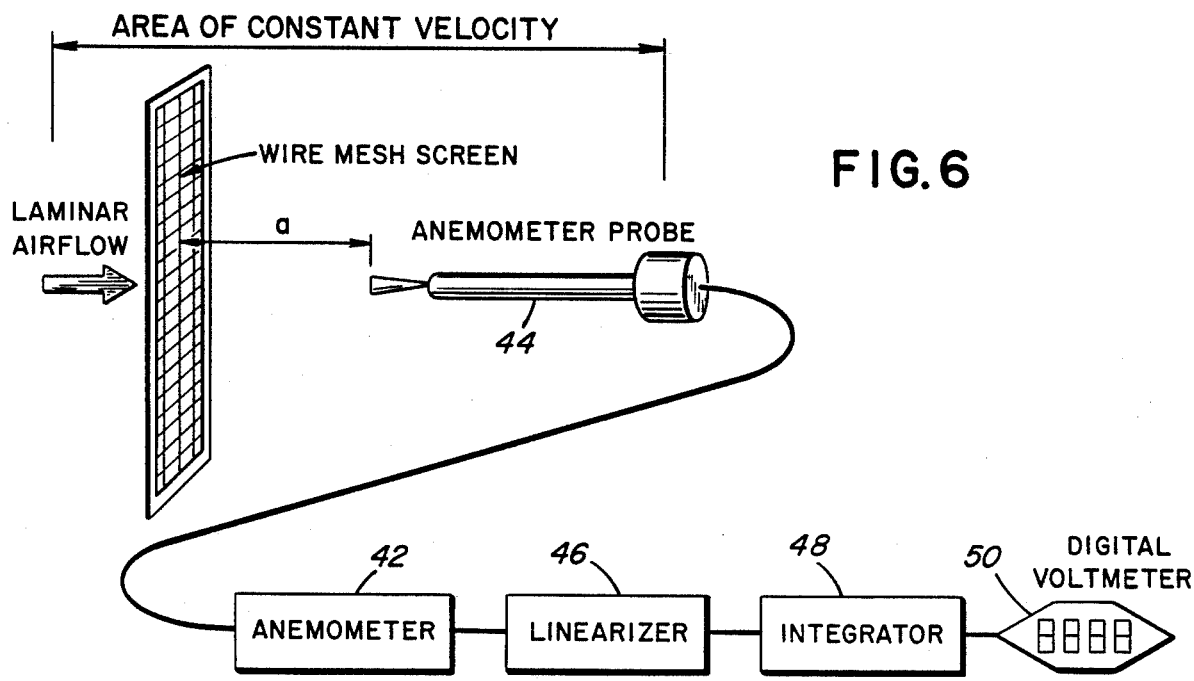
FIG. 6

FLOW VELOCITY vs. DISTANCE
14 GAUGE WIRE SCREEN

FLOW VELOCITY vs. DISTANCE
30 GAUGE WIRE SCREEN

FLOW VELOCITY vs. DISTANCE
60 GAUGE WIRE SCREEN

WINDSCREEN AND TWO MICROPHONE CONFIGURATION FOR BLAST NOISE DETECTION

STATEMENT OF GOVERNMENT INTEREST

The invention described and claimed herein may be manufactured and used by or for the Government of the United States of America for governmental purposes without the payment of royalties thereon or therefor.

BACKGROUND OF THE INVENTION

1. Field of the Invention

The invention relates generally to blast noise measurement systems and particularly to a windscreen and vertical microphone configuration supported by the windscreen for eliminating wind noise interference.

2. Description of the Prior Art

Blast noise measurement and monitoring systems have previously been available and have utilized microphone arrangements for detection, measurement and monitoring of blast noise. Prior blast noise monitoring systems utilizing microphones for receiving acoustical data and processing the data have typically involved the horizontal spacing of microphone receivers. However, such prior systems suffer from the disadvantages that the acoustical signals arrive at the microphones at different times, thereby causing signal processing to be greatly complicated. Further, prior systems introduce inaccuracies into processed acoustical data since wind noise interference has not been successfully eliminated and the resulting acoustical data suffers from the inclusion of wind-generated pseudosound artifacts. Further difficulties inherent in a number of prior art systems involve the lack of portability of such systems, thereby rendering these systems less useful in the usual environmental noise measurement situation.

Examples of sound modifying structures useful with microphones and sound intensity measurement apparatus are provided in a number of issued United States patents. U.S. Pat. No. 3,550,720 to Ballard, a plurality of screens are disposed about a transducer in order to reduce the effect of wind on signals picked up by the transducer. Anderson et al in U.S. Pat. No. 2,520,706 provide a windscreen for use with a dual microphone arrangement, the windscreen being intended to reduce wind velocity incident on the microphones to prevent the generation of spurious sounds occasioned by wind flow but without appreciably attenuating soundwaves received by the microphones. In U.S. Pat. No. 4,236,040, Chung utilizes a pair of closely spaced microphones in a meter intended to measure sound intensity. Chung also provides a system for processing the output signals of the microphones.

Other United States patents which disclose examples of sound modifying structures useful with microphones are identified as follows:
U.S. Pat. No. 1,914,099—Bedell
U.S. Pat. No. 2,263,408—Lakhovsky
U.S. Pat. No. 2,200,097—Phelps
U.S. Pat. No. 2,325,424—Rettinger
U.S. Pat. No. 2,395,719—Bright
U.S. Pat. No. 2,536,251—Caldwell, Jr.
U.S. Pat. No. 2,623,957—Cragg et al
U.S. Pat. No. 3,154,171—Knutson et al
U.S. Pat. No. 3,265,153—Burroughs
U.S. Pat. No. 3,515,240—Sugiyama et al The prior art thus noted fails to provide a portable windscreen and microphone supporting system which is effective to reduce interference from wind-generated pseudosound and which is also acoustically transparent so as not to interfere with the reception of acoustical data by a pair of microphones which are vertically spaced from each other and mounted within the windscreen. The present invention thus provides a vertically spaced microphone configuration shielded by an arrangement of concentric windscreen cylinders which eliminates the problem of wind noise interference, particularly in the measurement and monitoring of low-frequency acoustic blast noise.

SUMMARY OF THE INVENTION

The present invention provides a system for detecting and monitoring blast noise and which consists of a windscreen apparatus capable of mounting a pair of vertically spaced microphones in a manner which reduces or eliminates wind-induced noise interference, particuarly in the measurement of low-frequency acoustic blast noise. The windscreen apparatus of the invention comprises concentric cylindrical screen elements preferably formed of aluminum or brass wire mesh and arranged in a disposition whereby the coincidental longitudinal axes of the cylindrical windscreens are disposed in a vertical orientation. Two microphones are mounted to the windscreen apparatus along the longitudinal axis of the windscreen apparatus at a particular vertical spacing so that the signal from a horizontally propagating blast wave will arrive simultaneously at both microphones, thereby allowing simplification of signal processing.

Accordingly, it is a primary object of the invention to provide a system for the detection, measurement and monitoring of blast noise, particularly low-frequency acoustic blast noise, wherein the system includes concentrically arranged cylindrical windscreens mounting a pair of vertically spaced microphones centrally therein, the windscreens acting to reduce interference from wind-generated pseudosound yet be acoustically transparent, the vertical arrangement and spacing of the microphones within the windscreen simplifying processing of the acoustical data.

It is another object of the present invention to provide a simplified processing system for acoustical data generated by low-frequency acoustical blast noise measured by a pair of vertically spaced microphones having a windscreen supporting arrangement which reduces interference from wind-generated pseudosound.

It is a further object of the present invention to provide an acoustically transparent windscreen apparatus capable of mounting vertically spaced microphones and reducing wind-induced noise interference in the measurement of low-frequency acoustical blast noise.

Further objects and advantages of the invention will become more readily apparent in light of the following detailed description of the preferred embodiments.

BRIEF DESCRIPTION OF THE DRAWINGS

FIGS. 4a and 4b are schematics which illustrate respectively the acoustical and electrical derivations of a windscreen equivalent circuit;

FIG. 5 is a schematic illustrating an equivalent electrical circuit of a windscreen configured according to the invention;

FIG. 6 is a diagram illustrating an experimental arrangement including a hot-wire anemometry system used to determine windscreen spacing;

DESCRIPTION OF THE PREFERRED EMBODIMENTS

Figure 3:
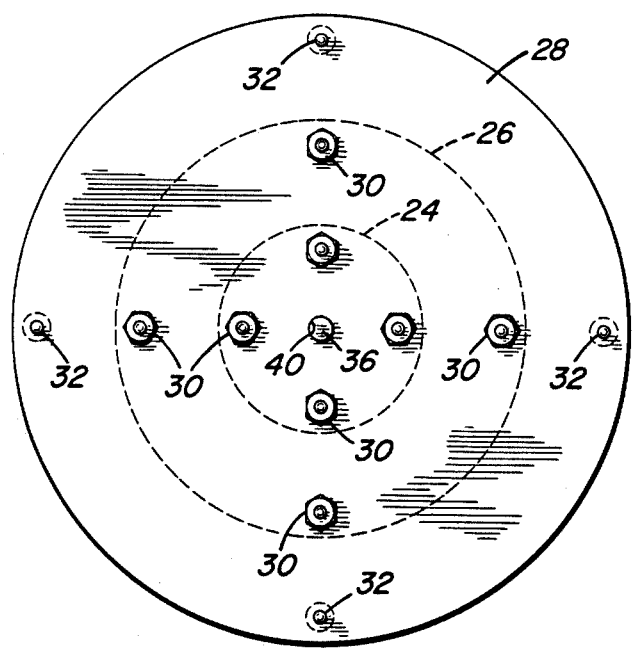
FIG. 3 is a top view of the apparatus of FIG. 2.
Figure 1:
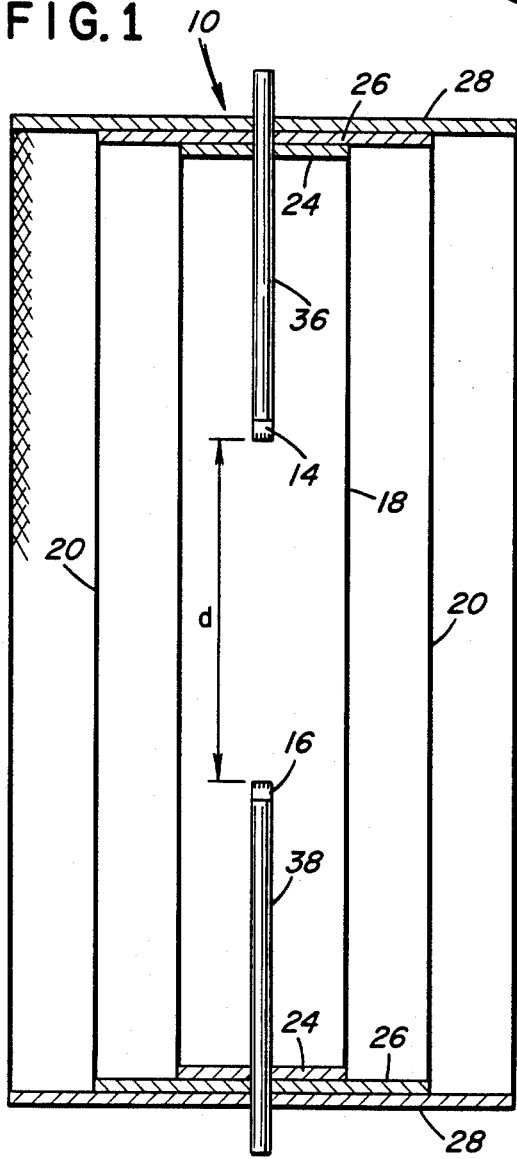
FIG. 1 is a schematic illustrating the general arrangement of concentric cylindrical windscreens and vertically spaced microphones comprising the invention.
Figure 2:
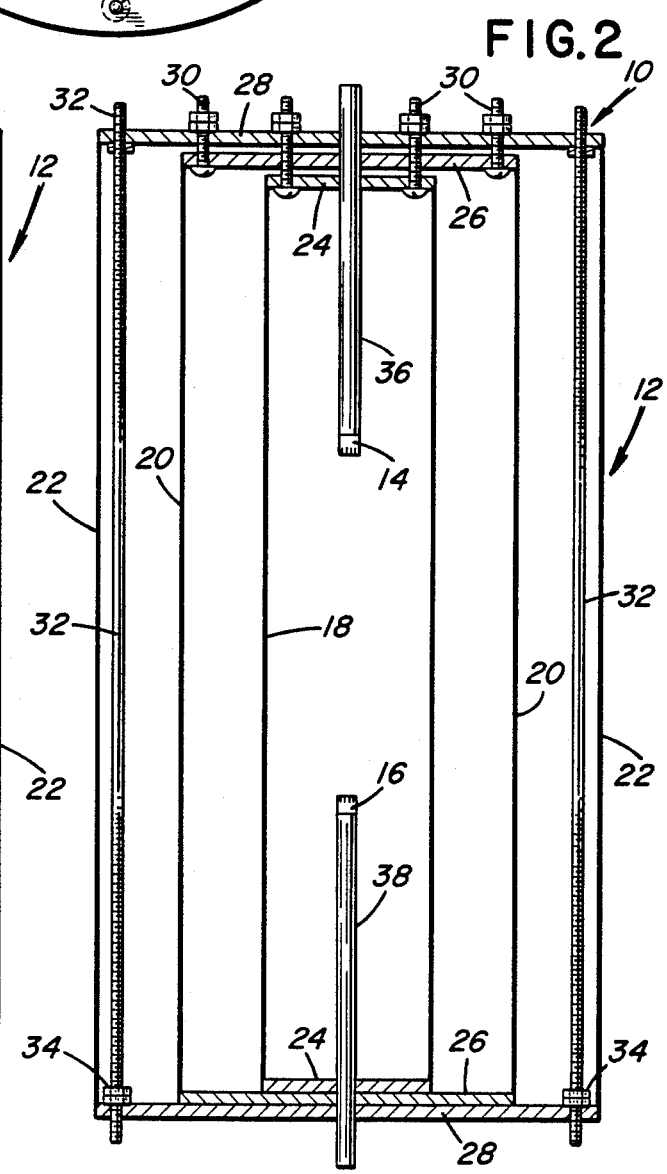
FIG. 2 is a side elevational view in section of a preferred windscreen apparatus mounting vertically spaced microphones used for detection of blast noise according to the invention.

The structure and operation of the present system has a basis in the difference in nature of a signal from a horizontally propagating low frequency sound wave and that signal produced by atmospheric tubulence impinging on a microphone. The signal which is produced by a horizontally propagating blast wave is highly coherent between two microphones such as are relatively positioned according to the invention. In practice, such signals will arrive at the two microphones with near simultaneity. On the other hand, the signals produced by turbulence become increasingly incoherent as the separation between two microphones increase. The minimum spacing at which maximum performance occurs is determined experimentally as will be noted in detail hereinafter. The present invention particularly recognizes that the signal from a horizontally propagating blast wave will arrive at each of two properly spaced microphones simultaneously only for a vertical microphone separation and that the microphone arrangement of the invention acts to simplify signal processing. Accordingly, the two vertically spaced microphone array of the invention acts to minimize the correlation between turbulence-induced wind noise signals and maximizes the coherence of acoustical signals between the microphones. The vertically spaced microphone configuration and windscreen arrangement of the invention coupled with the signal processing which can be employed due to the microphone arrangement acts to virtually eliminate the problem of wind noise interference during the measurement of blast noise. Referring now to FIGS. 1 through 3, the windscreen and microphone arrangement is seen generally at 10 to comprise a windscreen 12 and two vertically spaced microphones 14 and 16 mounted within the windscreen 12. The windscreen 12 is comprised of concentric cylinders 18, 20 and 22 preferably formed of an aluminum or brass wire mesh, the cylinders being concentrically arranged such that the longitudinal axes of the cylinders are coincidental. The longitudinal axes so defined are disposed in a vertical orientation and the microphones 14 and 16 are disposed along the longitudinal axes of the cylinders 18, 20 and 22 at a separation distance d. The cylindrical geometry of the windscreen 12 lends itself to this preferred microphone placement and also allows ease of construction, greater rigidity and enhanced portability of the windscreen 12. The cylindrical geometry of the windscreen 12 is, of course, of maximum effectiveness in reducing turbulence.

As is shown in FIGS. 1 and 2, it is preferred to use three cylinders and to have the immediately inward cylinder from each of the cylinders be disposed entirely within the confines of each said cylinder.

The spacings between the cylinders 18, 20 and 22 are to be kept to a minimum while still providing maximum flow reduction. Cylinder spacings which exceed those at which the turbulence resulting from flow passage through the cylinders do not result in a greater flow rate reduction. Accordingly, it is possible to maintain relatively small spacings while providing maximum flow reduction and still produce a structure which is easily fabricated, has the necessary rigidity and which is sufficiently small to be portable. A particularly useful spacing between the cylinders 18, 20 and 22 has been empirically chosen at 6.4 cm (2.5 inches).

Each of the cylinders 18, 20 and 22 are respectively provided with header plates 24, 26 and 28 to which the cylinders are connected and which allow mounting of the cylinders together as is particularly shown in FIG. 2. The header plates 24, 26 and 28 can be formed of plywood or similar material and can be bolted together at the upper end through the use of connectors 30 which can comprise simple nuts and bolts. The header plates 28 can further be joined with threaded rods 32 and associated T-nuts 34 about the outer periphery of the windscreen 12, thereby resulting in a structure having a desired rigidity. The rods 32 and T-nuts 34, as well as the connectors 30, act to maintain the cylinders 18, 20 and 22 in place in the proper cylindrical shape without deformation of the cylinders or of the total structure. The cylinders 18, 20 and 22 are thus kept under tension from the top to the bottom of the windscreen 12 at all times to prevent any significant movement of the elements of the structure relative to each other. Tension is applied to the cylinder 22 by rotation of the rods 32 which pushes the outer most header plates 28 apart. The innermost cylinders 18 and 20 are put under tension by pulling the header plates 24 and 26 apart through the use of the connectors 30. Once the cylinders 18, 20 and 22 have been put under tension, the windscreen 12 maintains its rigidity and is relatively free of deformation.

The microphones 14 and 16 are shown in FIGS. 1 and 2 to be held at the desired separation distance d by means of mounting rods 36 and 38 respectively, the rods 36 and 38 respectively extending through the uppermost header plates 24, 26 and 28 and the lowermost header plates 24, 26 and 28 through respective apertures 40 formed centrally within the plates, the rods 36 and 38 being respectively so mounted in order to maintain the microphones 14 and 16 in the desired vertically spaced relationship. The mounting rods 36 and 38 extend along the longitudinal axis of the windscreen 12 which is effectively formed by the coincidental longitudinal axes of the cylinders 18, 20 and 22.

The height of the cylinder 22 and header plates 28 is typically chosen to be approximately 30 inches with the cylinder 20 and header plates 26 being approximately 29 inches and the cylinder 18 and header plates 24 being approximately 28 inches. The uppermost header plates 24, 26 and 28 are typically spaced according to the tensioning arrangement noted above at spacings of approximately ¼ inch. The cylinders 18, 20 and 22 are respectively spaced from the longitudinal axis of the windscreen 12 at radii of approximately 2½ inches, 5 inches and 7½ inches respectively.

It is necessary that the windscreen 12 reduce interference from wind-generated pseudosound and be acoustically transparent so as not to interfere with the reception of acoustic data by the microphones 14 and 16. In order that the windscreen 12 can be evaluated with respect to acoustical transparency, an acoustical model yielding an equivalent electrical circuit is useful and demonstrative of the effectiveness of the windscreen 12. After derivation of the model, a transfer function can be produced from analysis of the equivalent circuit and will predict system response to a given excitation. Of the two widely known acoustical models, impedance and mobility, the impedance analogy is chosen for modeling of the windscreen 12 since the input and output of the present system are both pressure which is analogous to voltage in the impedance model. Accordingly, volume velocity in the present acoustical system is analogous to current in the equivalent circuit. The major assumption made to facilitate model derivation is that the device is small compared to the wavelength of the incident soundwave. With these assumptions the pressure at the input to the windscreen 12, that is, on the outer face of the windscreen 12, will be constant at all points on it, this assumption placing a constraint on the upper frequency limit of the model. For the dimensions of the windscreen 12 as noted above, this upper frequency limit is approximately 550 Hz which corresponds to a phase difference of less than 10° over any spatial interval on the windscreen 12. Characteristics of the derived transfer function above this frequency are excluded from consideration, this exclusion not presenting a problem since the spectrum of a blast noise signal is heavily concentrated at low frequencies with little spectral energy above 500 Hz.

Referring to FIGS. 4a and 4b, it is seen that the acoustical model can be derived with consideration of the acoustic parameters, pressure and volume velocity, at each of the cylinders 18, 20 and 22. Let R represent the total acoustic resistance of the mesh forming the cylinders 18, 20 and 22 and C represent the acoustic compliance of the cavity formed within the cylinders 18, 20 and 22. The volume velocity of air flowing through the cylinders as a result of the pressure gradient $P_2 - P_1$ is represented by U. The volume velocity U then separates into two volume velocities $U_1$ and $U_2$, the volume velocity indicent on the rest of the system being represented by $U_1$ and the volume velocity compressing the air in the cavity being represented by $U_2$. Taking into account the law of conservation of mass, $U = U_1 + U_2$ and thus represents a node in the equivalent circuit. In the model so described, conservation of mass in the acoustical systerm is analogous to Kirchofs's Current Law in the electrical system. Using the circuit elements thus derived from a consideration of FIGS. 4a and 4b as building blocks, an equivalent circuit for the entire windscreen 12 can be formed and is shown in FIG. 5. In FIG. 5, $P_i$ is the input voltage representing the acoustic pressure incident on the windscreen 12 and $P_o$ represents the output voltage corresponding to the pressure seen by a transducer or, in this situation, either of the microphones 14 and 16. A transfer function representing $P_o/P_i$ as a function of radian frequency is easily found using the LaPlace transform, this transfer function being $$\frac{P_o}{P_i} = \frac{1}{\beta_3 s^3 + \beta_2 s^2 + \beta_1 s + 1}$$

where:
$\beta_1 = R_1 C_1 + (R_1 + R_2) C_2 + (R_1 + R_2 + R_3) C_3$
$\beta_2 = R_1 R_2 C_1 C_2 + R_1 R_3 C_2 C_3 + R_1 (R_2 + R_3) C_1 C_3$, and
$\beta_3 = R_1 R_2 R_3 C_1 C_2 C_3$.

The transfer function is that of a three-pole low-pass filter, the frequency response characteristic of which can be computed and plotted after the coefficients $\beta_i$ are determined.

In order to determine the coefficients, it is necessary to evaluate the specific values of acoustic resistance and compliance which the windscreen 12 presents. To find resistance R, the specific acoustic resistance of the particular mesh cylinder is multiplied by the cross-sectional area of the cylinder. To find the compliance C, the following formula is used:

$$C = V/\rho_0 c^2$$

where:
V = enclosed volume,
$\rho_0$ = density of air, $\rho_0 = 1.29$ ($k_g/m^3$), and
c = speed of sound in air, c = 331(m/sec).
Using these formulas and the physical properties of the windscreen, the following values of $R_i$ and $C_i$ are calculated:

| | |
|---|---|
| $R_1$ = 6.2 acoustic ohms, | $C_1$ = 0.38 acoustic microfarads, |
| $R_2$ = 9.6 acoustic ohms, | $C_2$ = 0.22 acoustic microfarads, |
| $R_3$ = 20.0 acoustic ohms, | $C_3$ = 0.069 acoustic microfarads. |

These values are then used to calculate the transfer function coefficients $\beta_i$ in equation (1). The resulting transfer function consists of three poles, the lowest frequency pole occurring at 427 kilohertz. Thus, the response of the system is independent of frequency from 0 Hz to 427 kilohertz. The highest frequency at which the model is valid is only 550 Hz. Accordingly, the most general conclusion about the acoustic properties of the windscreen 12 which can be gained from the model is that the response of a cylinder is independent of frequency from 0 to 550 Hz. It is thus determined that the windscreen 12 is acoustically transparent in the frequency range of interest for blast noise.

In order to demonstrate the effectiveness of the windscreen 12 in reducing wind-generated pseudosound, a means of measuring wind noise levels is necessary. The following test procedure, when the microphone-windscreen arrangement 10 is exposed to outdoor wind conditions, determines the statistical distribution of levels of wind noise during periodic time intervals. This information can be used to predict the probability of occurrence of specific levels of wind noise for the wind conditions encountered. Performance evaluations can then be made by comparing the wind noise levels of the windscreen 12 with those of commercially available windscreens and bare microphones. The test procedure consists of separating the incoming mircophone data into blocks representing a fixed time interval, computing the peak and RMS signal level for each block of data, and storing these two parameters for later retrieval and conversion into a probability distribution. The first two steps are accomplished using an environmental noise monitor (not shown). The monitor accepts the microphone signal as input, digitizes the signal using an analog-to-digital (A/D) converter, and computes the peak levels for wind noise and how often wind noise levels may exceed this threshold.

TABLE 1

Comparative Peak SPL Measurements of Wind Noise for Evaluation of Author's Windscreen
Peak Flat Weighted Sound Pressure Level (dB)

| Test | Test Date and Duration | No Windscreen Mean | .1% Prob. | B & K 4921 Mean | .1% Prob. | Author's Prototype Mean | .1% Prob. |
|---|---|---|---|---|---|---|---|
| 1 | 10/8–40 min | 120 | 133 | 107 | 121 | 97 | 111 |
| 2 | 10/8–40 min | 123 | 135 | 109 | 123 | 99 | 112 |
| 3 | 10/8–40 min | 125 | 137 | 112 | 125 | 101 | 115 |
| 4 | 10/10–80 min | 116 | 127 | 103 | 115 | 92 | 107 |
| 5 | 10/10–80 min | 115 | 126 | 102 | 115 | 90 | 106 |

TABLE 2

Comparative RMS SPL Measurements of Wind Noise for Evaluation of Author's Windscreen
Flat Weighted RMS Sound Pressure Level* (dB)

| Test | Test and Date and Duration | No Windscreen Mean | .1% Prob. | B & K 4921 Mean | .1% Prob. | Author's Prototype Mean | .1% Prob. |
|---|---|---|---|---|---|---|---|
| 1 | 10/8–40 min | 110 | 121 | 99 | 112 | 86 | 99 |
| 2 | 10/8–40 min | 111 | 122 | 100 | 114 | 88 | 100 |
| 3 | 10/8–40 min | 112 | 125 | 103 | 116 | 90 | 104 |
| 4 | 10/10–80 min | 105 | 118 | 95 | 108 | 83 | 95 |
| 5 | 10/10–80 min | 104 | 117 | 95 | 107 | 83 | 94 |

*0.5 Second Leg - True integration and RMS signal levels in decibels (dB) for each block of data. This information is output in binary form through an interface to a Wang 600 computing calculator (not shown). The calculator accepts the noise level information and stores it in such a way as to compute the total number of blocks which exhibit the same peak or the same RMS level within a resolution of 1 dB. When data collection is complete, the calculator produces a printed output which indicates the number of blocks falling at a particular level, as a function of level, for both RMS and peak measurements. The calculator also outputs the total number of blocks of data recorded. From this information, probability distribution functions can be graphed, which characterize the recorded wind noise levels. In order for the data collection procedure to run in real time, the length of each block must be at least 400 milliseconds (ms), so that the required computations and data transfer can be completed within the space of a single block of time. For the evaluation of the prototype windscreen, a block length of 500 ms is chosen.

The results of tests using this procedure on microphones having no windscreen, the windscreen 12, and a cloth windscreen supplied with a commercially available Bruel and Kjaer 4921 outdoor microphone system (not shown) are summarized in Tables 1 and 2. The Bruel and Kjaer windscreen is a 12 cm diameter wire sphere covered with loosely woven stretched nylon cloth and is chosen because it is commonly used in outdoor microphone set ups. The tests are conducted under moderate to strong wind conditions since there were no acoustic events approaching the level of the recorded sound pressure levels present at typical locations, the levels thus being assumed to be the result of wind noise only. In the tables, two parameters are specified which characterize the statistical distribution of levels encountered during the test. The column labeled "mean" contains the mean level of the recorded samples; the column labeled "0.1% PROB." contains the figures corresponding to a 0.1% probability that a randomly chosen 0.5 second block will exceed this level. This second measure is useful in determining threshold The performance of the windscreen 12 can best be characterized by the reduction in wind-induced sound pressure levels over other windscreens subjected to the same wind field. The figures in Tables 1 and 2 show a significant reduction in wind noise levels for the prototype over those generated with the Bruel and Kjaer cloth windscreen. The windscreen 12 exhibits peak sound pressure levels which are at leat 10 dB lower than those form the cloth windscreen. In RMS levels, the windscreen 12 affords about 12 dB of wind noise reduction over the Bruel and Kjaer model. Overall, the windscreen 12 reduces peak wind noise levels by about 21-24 dB compared with an unscreened microphone.

When blast noise measurements are conducted, the normal method of separating wind noise from acoustic data is to set a threshold level below which the signal is assumed to be wind noise and above which it is assumed to be an acoustic "event". Of course, the major drawback to this method is that acoustic data of sound pressure levels lower than the threshold is lost. A further disadvantage is that no matter how high the threshold may be set, there is a nonzero probability that wind noise levels will exceed it, creating false data. A typical threshold value used when making measurements with a Bruel and Kjaer 4921 microphone system equipped with a cloth windscreen is 105 dB peak SPL. The figures in Tables 1 and 2 indicate that, when using the windscreen 12, the threshold may be reduced to perhaps 95 dB. This means that the data acquisition system will be able to measure a 10 dB wider dynamic range of acoustic signals with no increase in the probability of obtaining false data. The threshold method of separating wind noise from acoustic signals can be thought of as a simple signal processing algorithm. A more refined algorithm will be described hereinafter for detection of a far greater range of acoustic data with lower probability of error.

Figure 7A:
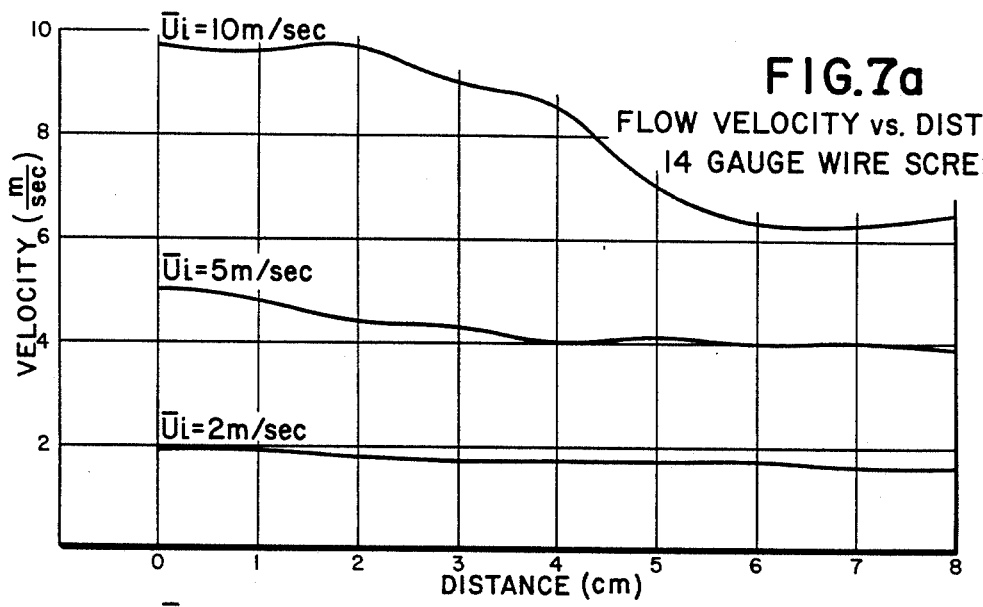
FIGS. 7a, 7b and 7c are graphs illustrating experimental data produced with the arrangement of FIG. 6 with differing wire screen arrangements and differing incident flow velocities.
Figure 7B:
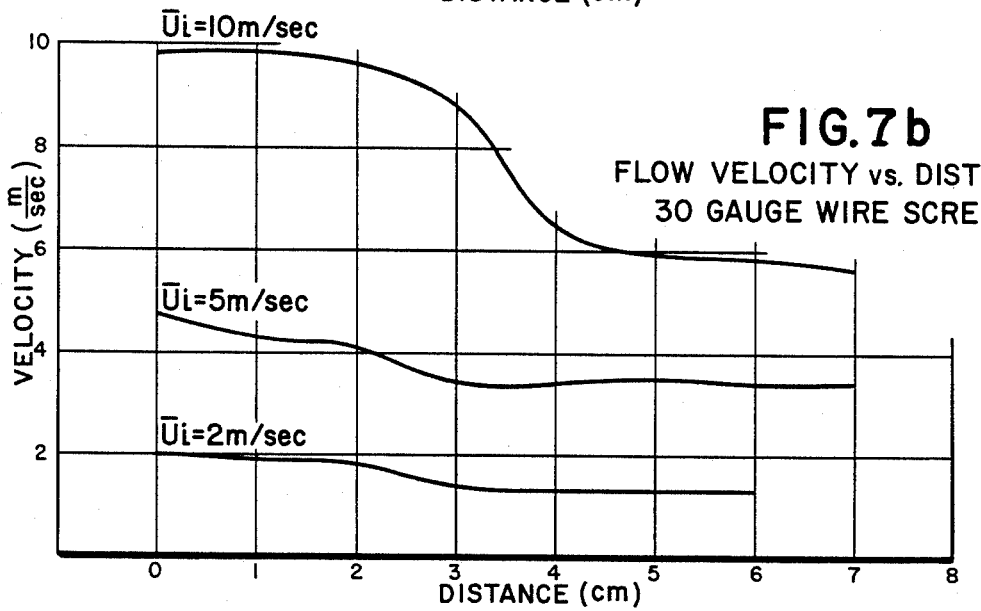
Figure 7C:
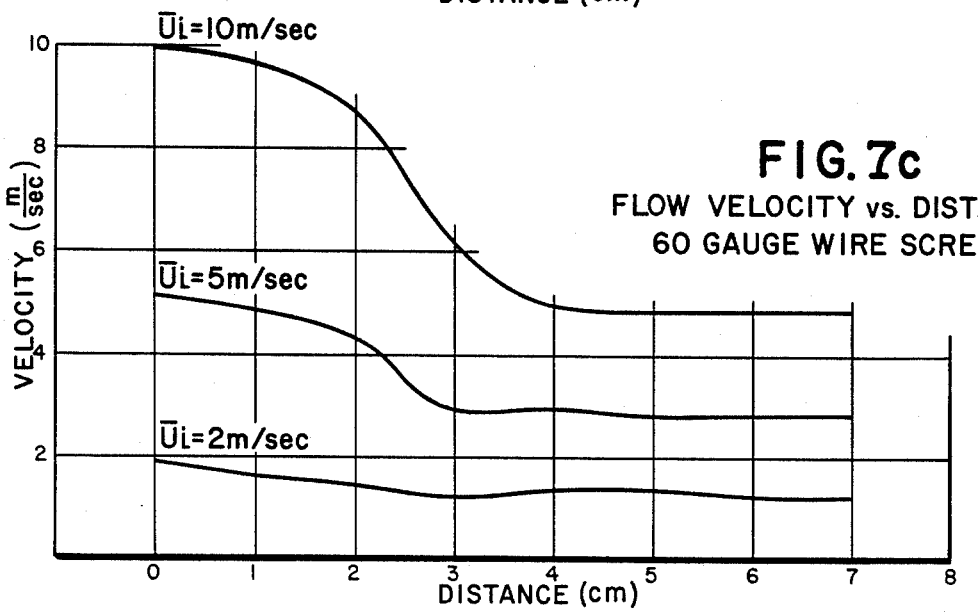

A proper spacing between the cylinders 18, 20 and 22 is optimized empirically with the experimental arrangement illustrated in FIG. 6, the data generated being graphically presented in FIGS. 7a through 7c. The experimental protocol thus represented is designed to measure the mean flow velocity as a function of position downstream of a mesh screen cylinder which is placed in a laminar air flow. As the viscous forces at work within turbulent eddies dissipate flow energy as heat, it is seen that mean velocity will decrease as the position downstream is increased. As turbulence dies out further downstream, the mean flow velocity will approach some final velocity which is a fraction of the incident flow velocity. The optimum spacing between the cylinders 18, 20 and 22 is then taken to be the point at which the turbulence vanishes, no further reductions in velocity of the flow then being realized. The spacing which is preferred will provide the greatest possible reduction in flow velocity while being as small as possible, thereby keeping the size of the windscreen 12 at a minimum to aid fabrication and portability.

Referring now to FIG. 6, flow experiments are carried out using a constant velocity laminar flow source and a hot-wire anemometry system. Anemometer 42 produces a signal which is a function of the instantaneous flow velocity at anemometer probe 44 the signal is input to a linearizer 46 which is calibrated to produce an output voltage which is linearly dependent on flow velocity. The signal then goes to an averaging circuit (not shown) incorporated in integrator 48 to produce an RMS voltage which can then be read on digital voltmeter 50. The test procedure consists of positioning screen 52 in the airflow and then recording the observed flow velocities as the separation a is varied. One assumption is that the flow velocity stays constant with distance in the absence of a screen and is checked by measuring the average flow velocity as a function of position for the incident flow with no screens. The velocity was found to be reasonably constant over a distance of 40 centimeters (cm). This area, shown graphically in FIG. 6 as the area between arrows, was used for measuring the flow reduction of the screens used in the experiment.

The experiment was carried out with a number of different wire screens at several incident flow velocities. The results are given in graphical form by FIGS. 7a, 7b and 7c and can be summarized as follows. For a given wind velocity, finer mesh screens provide a greater reduction in velocity than coarser mesh. Also, the separation distance at which velocity reaches its final value $a_c$ becomes shorter as the mesh size is reduced. When the incident flow velocity is varied for a given screen 52, the reduction in velocity as a fraction of the initial velocity increases, a result likely due to the greater turbulence at the higher velocities incuding more viscous losses. Finally, $a_c$ increases with increasing velocity. A summary of $R_v$, the fractional reduction of velocity, and $a_c$ for all combinations of screens and initial velocities, is found in Table 3. From the observed values of $a_c$ in the table, a separation distance of 6 cm between screens was selected for the windscreen cylinders 18, 20 and 22.

TABLE 3

Results of Experiments Comparing Various Sizes of Wire Screen in Laminar Flow Rate Reduction

| Wire Mesh Gauge | Incident Velocity (m/sec) | $A_c$ (cm) | $R_v$ |
| --- | --- | --- | --- |
| 14 | 2 | 3 | .81 |
| 14 | 5 | 4 | .80 |
| 14 | 10 | 6 | .68 |
| 30 | 2 | 3 | .71 |
| 30 | 5 | 3 | .68 |
| 30 | 10 | 5 | .59 |

TABLE 3-continued

Results of Experiments Comparing Various Sizes of Wire Screen in Laminar Flow Rate Reduction

| Wire Mesh Gauge | Incident Velocity (m/sec) | $A_c$ (cm) | $R_v$ |
| --- | --- | --- | --- |
| 60 | 2 | 3 | .62 |
| 60 | 5 | 3 | .58 |
| 60 | 10 | 4 | .49 |

Prior windscreen structures have reduced acoustic signal contamination caused by wind noise yet have not been capable of eliminating acoustic signal contamination altogether. Since wind noise at the output of a transducer increases with increasing wind velocity even with a windscreen, the possibility exists that a wind gust will occur with sufficient velocity to drive wind noise level above any set threshold and thus interfere with the reception of blast noise data. The present invention thus contemplates a multi-microphone digital processing system intended to gain a further reduction in the effect of wind noise signals. Processing according to the invention is based on the assumption that the desired acoustic signals are identical at each transducer or microphone 14 or 16 and that the wind noise signals are independent of each other and of the acoustic signal. In this situation, the observed signal $s_i(t)$ at a microphone i can be represented as the sum of the acoustic signal $p_i(t)$ and the nonacoustic wind noise $n_i(t)$. The representation $n_i(t)$ represents the wind noise waveform at the output of one of the microphones and $p_i(t)$ is the response to an acoustic pressure waveform. The microphone signal $s_i(t)$ is the sum of the two following signals:

$$s_1(t) = p_1(t) + n_1(t),$$

$$s_2(t) = p_2(t) + n_2(t).$$

Two assumptions about the nature of these signals are made; firstly, that the acoustic pressure waveforms are coherent $p_1(t) = p_2(t) = p(t)$. And, secondly, that the wind noise signals are independent of each other and of the acoustic signals as noted above. Then, $$E\{n_1(t)\,n_2(t)\} = 0,$$

$$E\{n_i(t)\,p(t)\} = 0.$$

The covariance of the two microphone signals is given by $$\text{cov}(s_1(t), s_2(t)) = E\{s_1(t)\,s_2(t)\},$$
$$= E\{(p_1(t) + n_1(t))(p_2(t) + n_2(t))\}.$$

Figure 8:
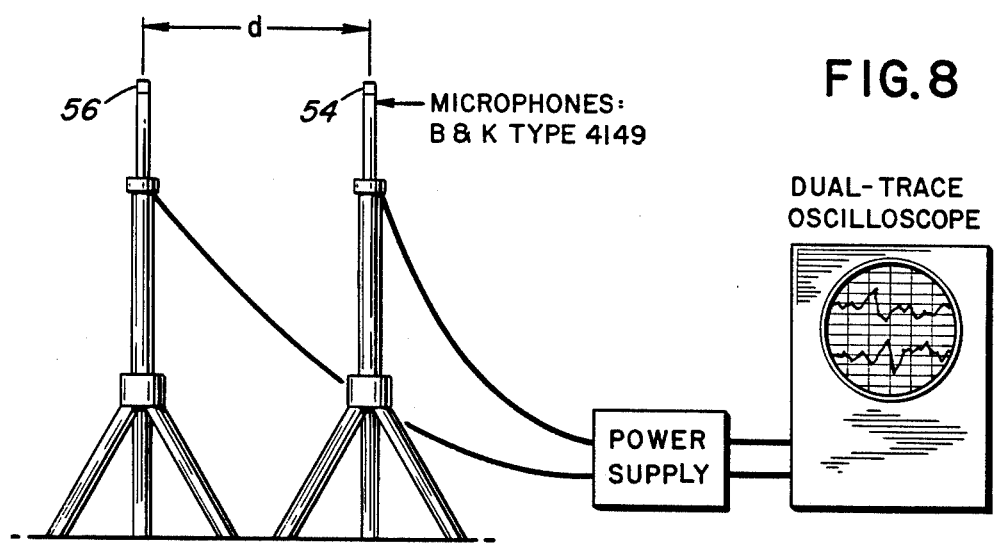
FIG. 8 is a schematic illustrating an experimental arrangement for visual correlation of wind noise signals.
Figure 9:
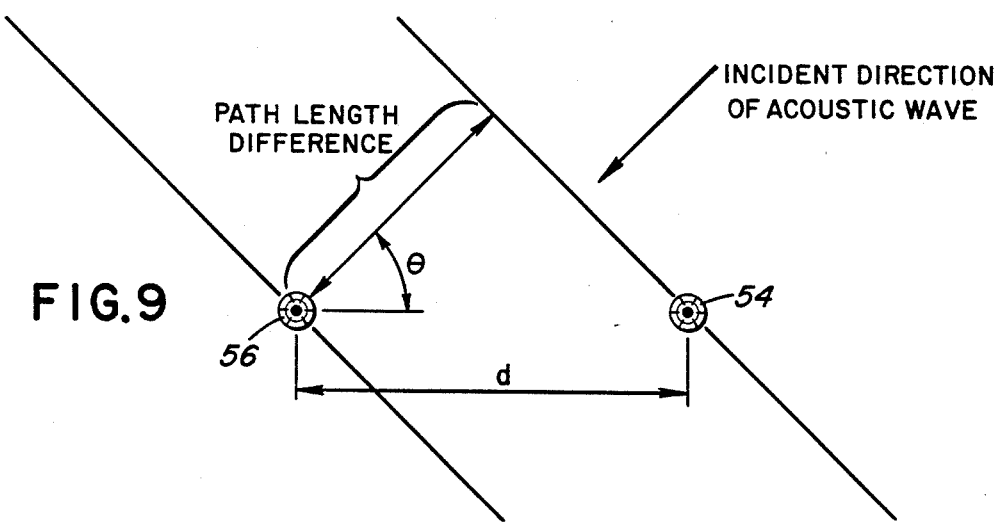
FIG. 9 is a schematic illustrating the microphone configuration of FIG. 8 from a top view.

Incorporating the two assumptions, the covariance calculations becomes $$\text{cov}(s_1(t), s_2(t)) = E\{(p(t) + n_1(t))(p(t) + n_2(t))\}$$
$$= E\{p^2(t) + p(t)n_2(t) = p(t)n_1(t) + n_1(t)n_2(t)\}$$
$$= E\{p^2(t)\},$$

which is the mean-square acoustic pressure waveform. Thus, a signal processor which performs a covariance (or cross-correlation) calculation, combined with the two microphone array can nearly eliminate wind noise from a microphone signal. The effectiveness of the system depends on the degree to which the two assumptions are correct. In theory, if the acoustic signals are totally coherent and the wind noise signals are independent, the noise signals can be completely canceled out. In practice, however, there will exist some degree of correlation between wind noise signals at the two microphones. The degree of correlation will, in general, be a function of the separation distance between the two microphones, the correlation being inversely proportional to the separation distance d. Thus, it is apparent that there will exist some separation $d_c$ at which the two wind noise signals will be effectively uncorrelated. A simple experiment was conducted using two microphones and an oscilloscope to determine $d_c$. As seen in FIGS. 8 and 9, two microphones 54 and 56 are set up outdoors one (1) meter from the ground with lateral separation d (with respect to the wind direction). A "visual" correlation was performed on the two signals as the separation d was varied. This visual correlation consisted of observing each microphone signal on one trace of a dual-trace oscilloscope 58 and comparing the signal waveforms. When no similarity between waveforms could be observed, the signals were judged uncorrelated. The "correlation length" is defined as the minimum separation $d_c$ at which the two microphone signals are uncorrelated. For the case of two microphones placed 1 meter from the ground in heavy winds, the correlation length was determined experimentally to be in the range of 22–30 cm. The correlation length was independent of wind velocity.

The other assumption, that of signal coherence, is of equal importance to the effectiveness of the signal processing algorithm. For the case of blast noise measurement for which the source is distant, the pressure disturbance takes the form of a plane wave whose direction of motion is parallel to the ground (or nearly so). If the transducers are spaced horizontally to the ground as in FIG. 8, the plane wave will not, in general, be incident on the two microphones 54 and 56 simultaneously. The time delay resulting from this path length difference between the microphones, as seen in FIG. 9, is expressed by:

$$\Delta t_d = (d/c) \sin \theta$$

where:
$\Delta t_d$ = time delay,
d = separation between transducers,
c = speed of sound, and
$\theta$ = angle of incidence of acoustic wave.

Given a nonzero separation, only when $\theta = 90°$ or $270°$ will $t_d$ be equal to zero and the signals coherent. This is in violation of the first noted assumption.

The solution to this problem according to the invention is to use a configuration in which the microphones 14 and 16 are spaced vertically. In theory, a horizontal plane wave incident from any angle $\theta$ will produce zero time delay, thus insuring signal coherence. The vertical spacing technique satisfies the assumptions. The configuration of the microphones 14 and 16 mounted by the windscreen 12 is shown as noted above in FIG. 1. The separation d in FIG. 1 is equal to the correlation length found by experiment. It has been shown empirically that the vertical and lateral correlation lengths are of approximately the same magnitude so the data from the lateral coherence measurement is valid for vertical separation also. In practice, atmospheric and ground effects can cause the propagation of sound over large distances to deviate slightly from the theoretical horizontal plane wave, but for separations such as those used herein, the effects are small. Thus, a vertical separation of the microphones 14 and 16 produces coherent waveforms for plane waves from any horizontal direction.

The processing algorithm shown above provides a means of extracting the mean-square acoustic pressure waveform $p^2(t)$ from the noisy microphone signals. A digital implementation of this algorithm requires one multiplication and many addition operations to be performed during each sample interval. For the purpose of developing a blast noise detection system, it is not necessary to have a complete waveform of the blast noise signal. However, a means of making a binary decision whether the signal received is blast noise or wind noise is needed. In this way, the processing requirements can be reduced over that of a sample-by-sample correlation.

The binary decision rule is based on the fact that the desired acoustic blast signals are impulsive in nature, having a strong peak at the onset of the blast. So it is natural that a processing algorithm detect blasts by looking for these peaks. Also, the previously made assumption of signal coherence for the two microphone signals implies that the peak pressure levels of the blast wave arrive at each microphone coincidentally, and with equal amplitudes. On the other hand, the probability that, within a certain time interval, the peak levels exhibited by the uncorrelated wind noise signals will occur simultaneously and with equal amplitudes is very small.

Given these circumstances, the processing algorithm works as follows: the incoming signal from each microphone 14 or 16 is digitized using an analog-to-digital (A/D) converter as noted hereinafter at a rate of 50,000 samples per second. Then the digital data is divided into blocks, corresponding to a time interval of 100 milliseconds (msec). A binary decision is to be made as to the presence or absence of a blast during each 100 msec block of data. The decision is based on the time of arrival (relative to the start of the block) and the amplitude of the highest peak in the waveforms recorded by each microphone 14 or 16. At the end of each block, the difference in time of arrival and the difference between the amplitudes of the highest peaks of the two signals are computed, then compared to preset tolerances. If both time of arrival and amplitude differences are within these tolerances, and the peak amplitude from both microphones are above a preset threshold, the system detects a blast and outputs a binary 1. Otherwise, the system detects no blast and outputs a 0. The output signal can then be routed to a counter, recording system, or display device as will now be described in detail.

Prior to discussion of the processing system per se, it is again emphasized that the two microphone array shown in FIGS. 1 and 2 is arranged vertically in order to minimize the correlation between tubulence-induced wind noise signals and to maximize coherence of the acoustic signal between the microphones 14 and 16.

Figure 10:
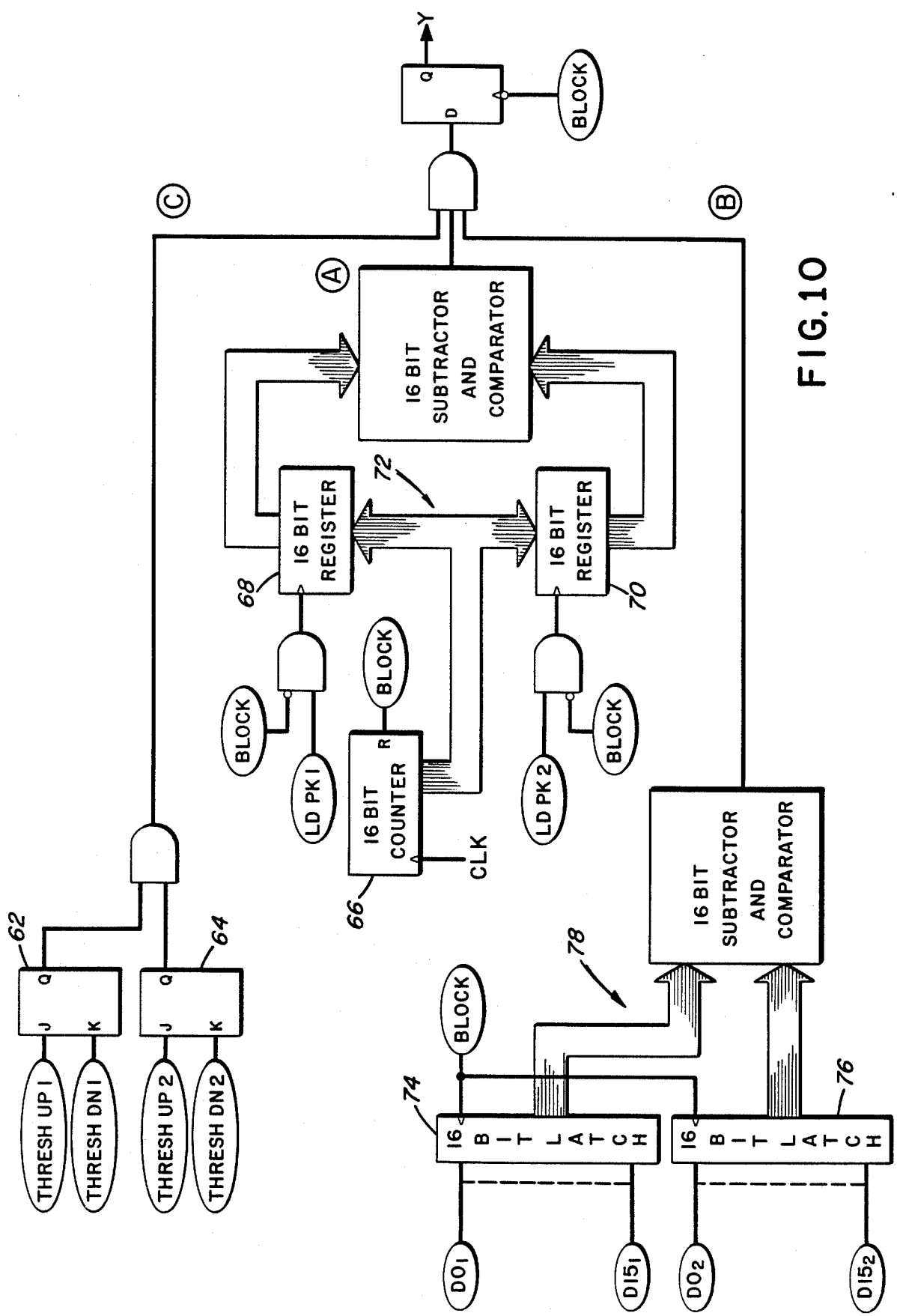
FIG. 10 is a block diagram of the signal processing system according to the invention; and, FIG. 11 is a block diagram illustrating an alternate signal processing system according to the invention.

Referring now to FIG. 10, a signal processing subsystem 60 according to the invention realizes a binary decision signal detection algorithm. The subsystem 60 accomplishes a binary (yes-no) decision whether a blast noise signal is present or not rather than involving a more complex sample-by-sample correlation. The subsystem 60 utilizes a digital acoustic noise monitor (not explicitly shown) labeled as THRESH UP in FIG. 10. A voltage comparator (not shown) can be used in place of the digital acoustic noise monitor to provide the signals. The circuitry shown in FIG. 10 requires a signal as input which is a pulse indicating that the microphone signal waveform has exceeded a preset threshold. The THRESH UP signals from the two vertically spaced microphones 14 and 16 (not shown in FIG. 10) are used to trigger two monostable multivibrators (one shots) 62 and 64 which output a pulse of fixed duration. In detail, the timing circuitry of the digital acoustic noise monitor produces a signal, BLOCK, which defines the end of a block of data. The signal is a pulse of width 20 microseconds. The monitor can be programmed to process blocks of length 0.1 seconds to 99.9 seconds in 0.1 second increments. In order for the subsystem 60 to function properly, the two monitors providing the THRESH UP signals to the multivibrator 62 and 64 must be synchronized exactly so that each block falls at the same time for both of the monitors. The BLOCK signal serves three purposes, firstly, the signal re-initializes the external hardware. Secondly, the BLOCK signal inhibits further data acquisition for the computation of results and, thirdly, enables these results to be output to external devices.

LD-PK signals from the monitors are also 20 μs pulses which represent a peak occurrence. Whenever the instantaneous signal level, represented internally by a sample value from a A/D converter (not shown) exceeds the previously stored highest value for the current block, a pulse appears at LD-PK. It follows that the highest peak level in any block occurs at the time of the last pulse from LD-PK in that block. Since the A/D converter takes 50,000 samples per second, the resolution of the LD-PK pulse used as a timing signal is 20 μs. The LD-PK signals from each monitor are used to load the contents of a 16 bit, 50 kilohertz, free-running counter 66 into 16 bit registers 68 and 70. When the BLOCK signal is received, each of the two registers 68 and 70 will contain a binary number representing the time, measured backwards from BLOCK, of the highest peak in the signal waveform of the two microphone outputs in that block, to a resolution of 20 μs. When BLOCK is received, signifying the end of a block of data, the LD-PK signals are inhibited and a combinational logic circuit shown at 72 measures the absolute value of the difference between the values in the two registers. If this difference is within a certain small tolerance, the timing of the two peaks is judged as coherent and the circuit 72 outputs a binary 1 logic value at line A. This logic circuit 72 is implemented using gate array and programmable logic array (PLA) digital integrated circuits (not shown). Note that, although this circuit is producing an output at all times, the output is only valid after the BLOCK pulse has been encountered. It is to be understood that the LD-PK pulses rest 16 bit registers 68 and 70 to zero and the registers run until the block signal is received. In this manner, the time differences can be calculated between the two LD-Peak signals.

To test for amplitude coherence between the two microphone signal peaks, the contents of each monitor's peak holding register are examined. These are, in fact, the same registers that are loaded with a sample value from the A/D converter by the LD PK signal described earlier. When the current data block is ended by BLOCK, these registers contain the value of the highest instantaneous signal peak for each monitor. These values are latched into buffer registers 74 and 76 at this time, and another combinational logic circuit shown generally at 78' and similar to the circuit 72 described above, compares the absolute value of the difference between the two amplitudes to a tolerance. Again, if the difference is within the tolerance, a binary 1 is produced at line B. Other circuitry determines if both microphone signals are above a certain threshold during the block of data being processed. A signal from the monitor, THRESH UP, is activated whenever the instantaneous signal level from the A/D converter rises above a programmable threshold. Another signal, THRESH DN, informs circuitry of FIG. 10 that the signal level has dropped below the threshold. A feature of the THRESH DN signal is that a presetable amount of delay can be added before THRESH DN is activated. THRESH UP and THRESH DN are used as inputs to a J-K flip-flop within each of the multivibrators 62 and 64 whose output reflects whether the signal in the monitor is above threshold (1 if above threshold, 0 otherwise). When both monitor's signals are above threshold, the output of the AND gate (line C) is a binary 1.

The propagation delays of the circuitry used to generate signals A, B, and C are such that these signals are valid well before the end of the BLOCK pulse. Then, the results of the test on a block of data can be clocked into the D-type flip flop on the negative edge of the BLOCK signal as shown. The output of this flip flop is the final result of the computation and represents the binary decision on whether the previous block of data from the microphone system was a blast signal or wind noise. It is to be understood that the output of the D flip flop is a yes-no decision whether the signal represents wind noise or a blast signal.

Figure 11:
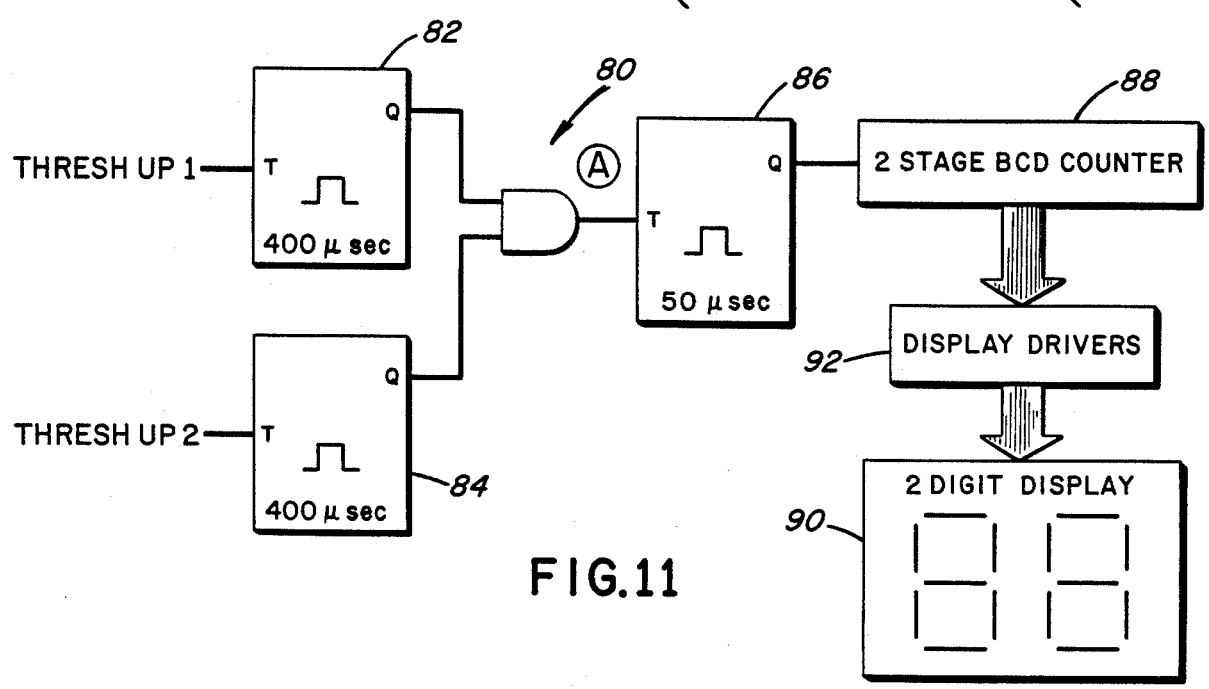

Although the signal processing subsystem 60 of FIG. 10 proves useful within the present system, a more simple signal processing subsystem 80 is seen in FIG. 11. The processing subsystem 80 also implements a binary decision rule and provides an approximation of the action of the algorithm noted above while having more simple hardware. FIG. 11 substantially represents a logic diagram of the subsystem 80 with operation of the circuitry being as follows. The THRESH UP signals 1 and 2 from each acoustic noise monitor (not shown) is a 20 microsecond pulse marking the exact time at which a programmable threshold level is exceeded by the microphone signal, the THRESH UP signal being used to trigger a monostable multivibrator (one shot) 82 or 84 as the case may be. A positive pulse of constant, controllable width is thus produced in response to a level transition at its input. The logical AND function of the pulse outputs of the multivibrators is performed. The output signal of line A in FIG. 11 represents coherence of the microphone signals. If the waveforms are coherent, both of the multivibrators 82 and 84 will produce a pulse within the tolerance specified by the pulse width and a positive transition will occur at A. If the microphone signals are not coherent, the output pulses from the multivibrators will not overlap and no signal appears at A. Accordingly, the signal at A represents the binary decision 1 if a blast has been detected and 0 otherwise. The circuit of FIG. 11 does not operate on data in discrete blocks but runs continuously. In order to observe the results of the binary decision by counting the number of blast detections and displaying this count, line A is used to drive a third monostable multivibrator (one shot) 86 to produce a pulse of constant duration used to clock a two-stage binary coded decimal (BCD) counter 88. The contents of the counter 88 are displayed by a two-digit LED display 90 which is driven by BCD display drivers 92. Reset signal is provided to the counter 88 by means of a switch (not shown). The circuitry of FIG. 11 is preferably fabricated using CMOS logic devices with the required signals from the monitor represented by the THRESH UP signals coming in at CMOS logic levels. The tolerance for coherence of the THRESH UP signals, determined by the output pulse width of the monostable vibrators 82 and 84 was set at 400 microseconds.

The invention is thus seen to provide a vertically spaced microphone configuration in association with concentrically arranged cylindrical windscreen elements and signal processing capability which acts to eliminate the problem of wind noise interference with blast noise measurement.

While the invention has been described explicitly in relation to the system elements shown and described above, it is to be understood that the invention can be practiced other than is expressly described hereinabove without departing from the intended scope of the invention. Accordingly, the scope of the invention is to be interpreted in light of the appended claims.

What is claimed is:

1. An apparatus comprising:
   a first and a second acoustical microphone in vertical disposition to each other, separated by an exerimentally determined distance d, wherein d is the distance at which a horizontally propagating sound wave will arrive simultaneously at both microphones, whereby the horizontally propagating sound wave is coherent with respect to the microphones, and wind-generated noise is incoherent with respect to the microphones;
   means for screening the microphones to reduce interference with the acoustical reception of the microphones from wind effects; and,
   means for processing acoustical signals received from the microphones.

2. The apparatus of claim 1 wherein the screening means comprise a plurality of cylindrical screen elements disposed concentrically relative to each other.

3. The apparatus of claim 2 wherein the cylindrical screen elements have their longitudinal axes coincident and wherein the microphones are disposed along the coincident longitudinal axes and within the confines of that volume defined by the screen elements.

4. The apparatus of claim 3 wherein the cylindrical screen elements interior of the outermost element are disposed within that volume defined by the outermost element.

5. The apparatus of claim 4 wherein the cylindrical screen elements are disposed at radial spacings of approximately 2.5 inches to each other.

6. The apparatus of claim 4 wherein the cylindrical screen elements are formed of a mesh material selected from the group consisting of aluminum and brass.

7. The apparatus of claim 4 wherein the number of cylindrical screen elements is three.

8. The apparatus of claim 4 further comprising header plates of circular configuration mounting each of the cylindrical elements at each end thereof to facilitate maintenance of the elements in a cylindrical configuration.

9. The apparatus of claim 8 further comprising means for holding the cylindrical screen elements under tension to maintain the elements in a rigid configuration.

10. The apparatus of claim 3 wherein the processing means comprises means for producing a signal pulse indicative of a signal waveform of either one of the microphone having exceeded a preset threshold.

11. The apparatus of claim 10 wherein the processing means further comprises two monostable one-shot multivibrators, one each connected to the output of one each of the microphones and being triggered by the signal pulse producing means, the multivibrators outputting a pulse of fixed duration.

12. An apparatus comprising:
    a first and a second acoustical microphone mounted in a vertical relation to each other;
    means for screening the microphones to reduce interference with the acoustical reception of the microphones from wind effects, wherein the screening means comprise a plurality of cylindrical screen elements disposed concentrically relative to each other so that their longitudinal axes are conincident and the microphones are disposed along the coincident longitudinal axes, within the confines of that volume defined by the screen elements;
    means for processing acoustical signals received from the microphones wherein the processing means comprise means for producing a signal pulse indicative of a signal waveform of either one of the microphones having exceeded a preset threshold, two monostable one-shot multivibrators, one each connected to the output of one each of the microphones and being triggered by the signal pulse producing means, the multivibrators outputting a pulse of fixed duration; and,
    means for timing the duration of the pulses output from the multivibrators and for producing a pulse in response to coherency of the microphone signals as determined by the fixed time duration of the multivibrator pulses.

13. The apparatus of claim 12 wherein the processing means further comprise counter means responsive to the timing means for recording the pulse produced by the timing means.

14. The apparatus of claim 11 wherein the processing means further comprise means for timing the duration of the pulse output from the multivibrators and for producing a pulse in response to coherency of the microphone signals as determined by the fixed time duration of the multivibrator pulses.

15. The apparatus of claim 14 wherein the processing means further comprise counter means responsive to the timing means for recording the pulse produced by the timing means.

* * * * *